United States Patent
Hennig

(10) Patent No.: US 6,957,625 B2
(45) Date of Patent: Oct. 25, 2005

(54) METHOD AND DEVICE FOR THE IMPROVED MILKING OF AN ANIMAL, IN PARTICULAR OF A COW

(75) Inventor: Bernd Hennig, Schönwölkau (DE)

(73) Assignee: WestfaliaSurge GmbH, Oelde (DE)

(*) Notice: Subject to any disclaimer, the term of this patent is extended or adjusted under 35 U.S.C. 154(b) by 70 days.

(21) Appl. No.: 10/380,737

(22) PCT Filed: Sep. 7, 2001

(86) PCT No.: PCT/EP01/10330

§ 371 (c)(1),
(2), (4) Date: Jul. 28, 2003

(87) PCT Pub. No.: WO02/23975

PCT Pub. Date: Mar. 28, 2002

(65) Prior Publication Data

US 2004/0025793 A1 Feb. 12, 2004

(51) Int. Cl.$^7$ .................................................. A01J 5/00
(52) U.S. Cl. .................................. 119/14.02; 119/14.47
(58) Field of Search ........................ 119/14.02, 14.47, 119/14.08, 14.48, 14.15, 14.49, 14.38

(56) References Cited

U.S. PATENT DOCUMENTS 6,145,471 A * 11/2000 Laub-Maier ............. 119/14.02
6,152,076 A * 11/2000 Laub-Maier ............. 119/14.08
6,439,157 B1 * 8/2002 Petterson ................. 119/14.47

FOREIGN PATENT DOCUMENTS

| DE | 2151501 | 4/1973 |
| DE | 3807256 A1 | 9/1989 |
| DE | 4406741 A1 | 9/1995 |
| DE | 19521569 A1 | 1/1997 |
| DE | 19636314 C1 | 4/1998 |
| DE | 197 20 487 A1 | 11/1998 |
| FR | 2530119 A1 | 1/1984 |

* cited by examiner

Primary Examiner—Yvonne R. Abbott
(74) Attorney, Agent, or Firm—Smith Law Office

(57) ABSTRACT

The invention relates to a method and a device for milking milk residues to achieve the extraction of as much of the milk as possible that is preset in the udder. According to the method, a rubber teat element (10) in a teat cup (1) is displaced in a milking motion by a negative suction pressure caused by adjustable pulse phases consisting of alternating suction and pause phases and of a pulse intensity, in order to a volumetric flow of milk. The volumetric flow is continuously recorded and if it decreases, the motion of the rubber teat element is modified in a targeted manner.

17 Claims, 1 Drawing Sheet

Figure 1:
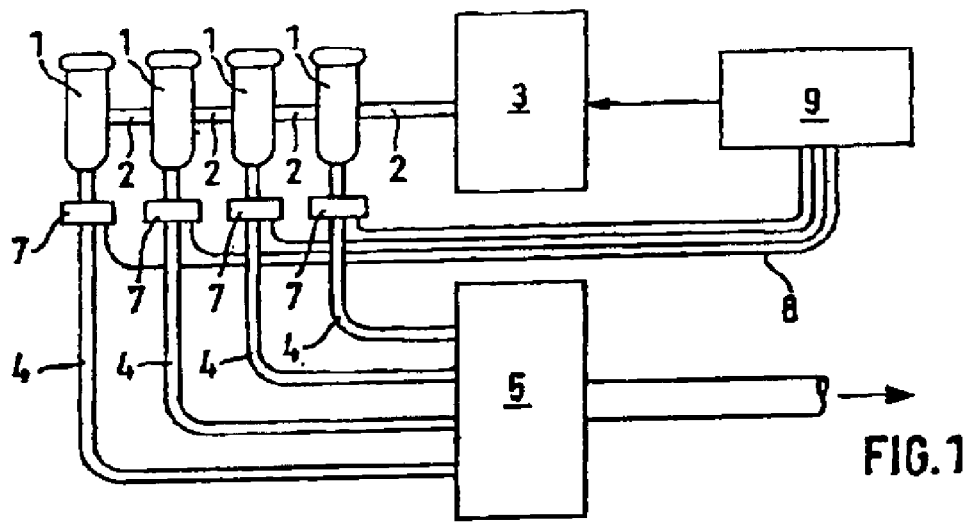

METHOD AND DEVICE FOR THE IMPROVED MILKING OF AN ANIMAL, IN PARTICULAR OF A COW

The invention concerns a method and a device for improved milking of an animal, especially a cow, within the framework of machine-milking according to the so-called suction milking principle.

In contrast to the traditional milking by hand, which is a pressure-milking method, and in which almost the entire amount of milk that is present in the udder can be milked, in the case of machine-milking, a problem arises, namely, that complete milking of the udder is not possible or possible only with difficulty and therefore residual milk can remain in the udder. The reasons for this are mainly due to the process, but there are also anatomical reasons. Thus, it may occur that, as a result of tilted or rotated teats of the udder, or unfavorable udder shape, but also due to the fact that the milking instruments that do not fit the teats exactly have an adverse influence on the suction-milking during the milking process, the ducts that conduct the milk in the teats are closed too early. As a result of this, especially in the end phase of the milking process, in the post-milking phase and in the milking-out phase, the yield of the milk is reduced in comparison to manual milking and also the quality of the obtained milk may be influenced adversely, since especially fat-containing milk components are produced particularly in the end phases of the milking.

Furthermore, the reason for the reduced milk yield in comparison to manual-milking lies in the physical conditions of machine-milking in the suction-milking method. As a result of the pressure drop in the udder toward the end of the milking process, the udder tissue reacts to this pressure drop and thus closes the milk ducts in the teat region. Because of the increased vacuum in the inside of the teat rubber of a milk cup, due to the reduced milk volume flow toward the end of the milking process, accumulation of fluid (development of edema) in the region of the Fürstenberg vein ring [literal] may be produced. Due to the development of this edema, as a rule, a permanent closure of the milk guiding ducts may occur in the teats, which can be opened again only by a higher downward tensional force. This effect is enhanced even more by the acceleration pressure and the flow pressure of the milk column. As a rule, this leads to the fact that the milk cup at the teat begins to climb, resulting in premature introduction of the milking-out or post-milking phase and, consequently, the milking process will end more rapidly than desirable. This can be prevented by a higher tensional force of the milk cup on the teat downward, but this is difficult since it may lead to the fact that the milk cup will drop off from the teat. Especially, in the case of a bulging udder and short teats, significant difficulties may occur here regarding the attachment of the milking equipment to the teats.

Moreover, additional equipment is required in order to achieve a downward directed tensional force on the milking equipment, which can additionally restrict the freedom of movement of the operator of the milking installation, where the space relationships are already tight. In addition, a further expenditure for equipment becomes necessary and the operation of the equipment will be not only more expensive, but also it will require cleaning and maintenance.

It is the task of the present invention to provide the method and a device for improved milking of milk residues which makes possible essentially complete milking of the milk present in the udder, is simple to operate and can be incorporated into existing installations for suction-milking with small expenditure for equipment.

This task is solved with the method according to claim 1, and with the device according to claim 13. Advantageous further developments and embodiments of the invention are the objects of the respective subclaims.

The method according to the invention is characterized by the fact that the milk volume flow, which is continuously received by the milking movement of the teat rubber in a milk cup through adjustable pulsation phases, and in which the reduction of the volume flow of the milk alters the teat rubber movement in a targeted manner. Through these measures, specific problems in the end phases of the milking process can be influenced in such a way that almost the entire milk content of an udder can be milked. As soon as the milk volume flow begins to decrease, the movement of the teat rubber is changed in a targeted manner in such a way that the pressure change in the milk cup or in the teat rubber and thus also in the milk-guiding ducts of the teats, is less abrupt, as a result of which the tissue reaction of the uterus, which otherwise occurs immediately and results in the closure of the milk ducts, can be delayed. As a result of this the residual milk content can be milked, which otherwise could be obtained only with manual-milking (pressure method). As a result of the fact that the milk-guiding ducts in the teat are closed relatively late, leaving the milking process unchanged, an overall increase in the milk yield is obtained and also high-quality milk components can be milked-out by the method using machine-milking. The entire milked milk volume of an udder also has a higher milk quality due to the high fat content. The change of the teat rubber movement can occur simultaneously on all milk cups of the milking machine. However, this is not absolutely necessary. Advantageously, the movement of individual or several teat rubbers can be altered. Here, the change can be uniform or nonuniform.

According to the advantageous embodiment of the invention, the teat rubber movement is first altered in a targeted manner when the milk volume flow goes below a predetermined threshold value over a certain time period. Such a threshold value can be adjusted individually to single animal species, single animals, lactation phases or also depending on the season, and, for example, can be determined by experiments or with the aid of values expected according to practice. As a result of this, it can be avoided that even a slight decrease of the milk volume flow during the main milking phase would incorrectly introduce the milking-out method or post-milking method according to the invention.

According to another advantageous embodiment of the invention, the duration of the pulsation phases (A) is increased, as a result of which the pulse of the suction-milking phase is reduced, so that closing of the milk ducts due to the reaction of the Fürstenberg venous ring can be delayed. A change of the pulsation phase duration can be obtained in a simple manner without any great additional expenditure for equipment.

According to another advantageous embodiment of the invention, the pulsation intensity of the rubber in the beginning of phases (B) is reduced, so that the pressure development inside the teat is weakened.

According to another advantageous embodiment of the invention, the teat rubber pre-tensioning is altered. As soon as the volume flow begins to decrease, the milking movement is influenced this way in a targeted manner, for example, by removing tension from the teat rubber itself, as a result of which, with constant pneumatic activation of the teat rubber, weakened suction-milking can still be achieved. The effect of this is the same as described above.

According to another advantageous embodiment of the invention, the method for introducing a continuous unloading phase of the teat rubber is used. In this way, the method provides a transition between the main milking phase, the post-milking phase and the milking-out phase, with regard to milk yield, and of the subsequent continuous unloading phase, in such a way that an essentially complete milking-out or emptying of the udder is provided. According to an aspect of this invention with this regard, the conventional main-milking phase and the post-milking and milking-out phases according to the invention run occasionally parallel with their deliberately alterable teat rubber movement. As a result of this, further increases in milk yield can be achieved, for example, when the milk volume flow increases again, one can return without transition into a main-milking phase with the conventional pulsation intensity and duration. This advantageous design of the invention can preferably be used in "quarter-individual" [literal] post-milking.

According to still another advantageous embodiment of the invention, as the milk volume flow decreases, the intensity of the changes of the teats rubber movement is increased proportionally. The greater the decrease of the milk volume flow, the more intensely are carried out the measures with which the too early closing of the milk ducts, due to the physical conditions in the end phases of the milking process, can be prevented.

According to another advantageous embodiment of the invention, the milk volume flow is measured separately for the individual teats and the teat rubber movement is controlled separately as a function of the corresponding milk volume flow. As a result of this, even in the case of sick or nonuniformly operating teats, the method according to the invention can be used advantageously to increase the milk yield.

The device for milking of milk residues, for an almost complete milking-out of existing milk according to the invention, has a milk cup and a teat rubber secured in it which can be set into a pulsed milking movement of different intensities by reduced pressure in the cup applied to suction connections, the milk cup having a milk outlet at its lower end for the milk volume flow, whereby a measuring equipment is provided to determine the milk volume flow, and, with the aid of a control unit, the teat rubber movement can be controlled in a targeted manner as a function of a change of the measured milk volume flow. This has the essential advantage that even in the end phases of the milking process, optimal milking can be achieved with an extremely low expenditure for equipment and thus greater milk yield can be obtained than before. In addition, no additional expenditure is needed for equipment which would be disturbing in the milking area since the volume flow measuring equipment can be arranged either directly on the milking cup itself or removed from the milking cup in the line for the milk volume flow. Naturally, the control unit can also be arranged so that it is removed from the actual teats and thus from the milking area. Thus, an essentially improved suction milk device can be provided in a very simple manner and with very low cost and with which higher yield can be achieved than before.

According to an advantageous embodiment of the device according to the invention, a manipulator is provided inside the milk cup in order to alter the teat rubber pre-tensioning. The manipulator can be actuated arbitrarily mechanically, pneumatically, hydraulically or electrically and is arranged inside the milk cup so that it is safe against contamination and is without any disturbing influence on the handling and application of the milking device. Here, pneumatic activation of the manipulator has the essential advantage that the pneumatic equipment necessary for producing the reduced pressure for suction is already present in the conventional suction pressure milking devices.

According to still another further advantageous embodiment of the invention, one or several air cushions, to which compressed air can be applied, are provided between the teat rubber and the milk cup. The air cushions can be designed in such a way that improved influence on the teat rubber movement and prevention of closing of the milk ducts in the teat become possible. Such an air cushion is applied in the already present space in the milk cup protected against external influences. It can be used to imitate the teat movement processes which are carried out during manual milking by the person who does the milking conventionally in the end phases of the milking processes.

According to another advantageous embodiment of the invention, on a control unit of the device, the duration of pulsations, the pulsation intensity and the pulsation course can be adjusted and correspondingly controlled as a function of time and as a function of any changes in the milk volume flow. The usual operating and display elements are provided for this on the control unit. In this way, with the device according to the invention, the post-milking phase can be individually adjusted to single animals, animal species or udder regions to produce increased yields, and it is also possible to achieve further increases in yield experimentally by changing the adjustable parameters of the control unit.

Figure 2:
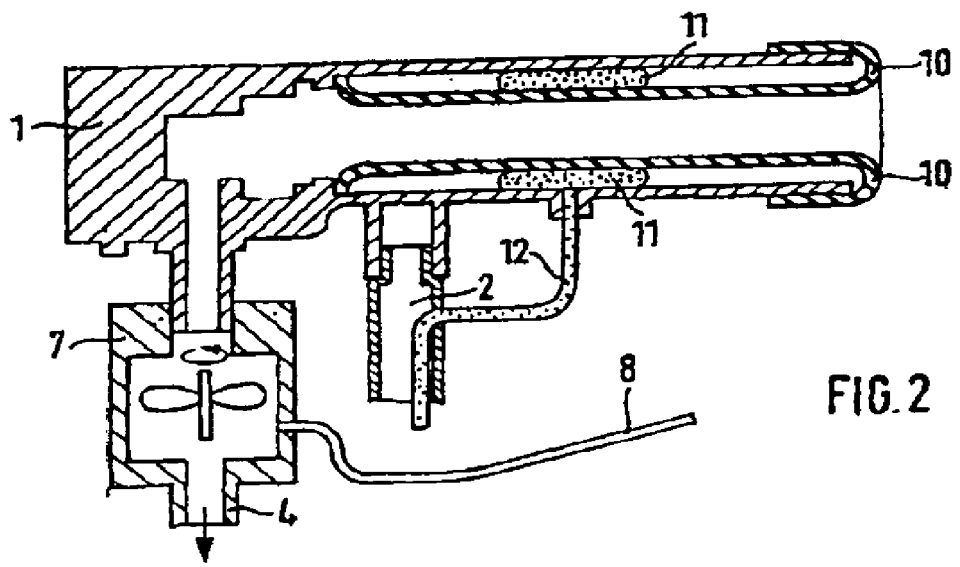
Figure 3:
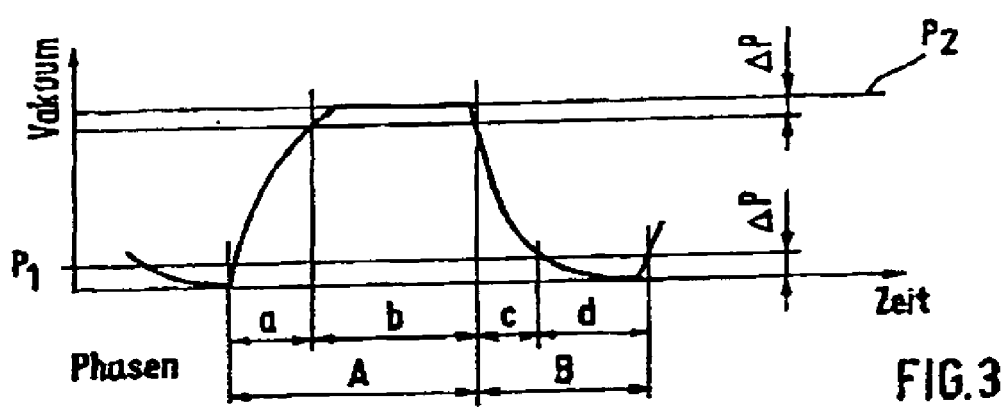

A preferred practical example of the invention is described in detail below with reference to the drawing. The drawing shows the following:

FIG. 1 is a schematic representation of a practical example of the milking device according to the invention with four milk cups and central control unit, FIG. 2 shows a milk cup from FIG. 1 in cross-section with the volume flow measuring equipment and air cushion manipulator, and FIG. 3 shows schematically the change of vacuum in the pulse chamber.

FIG. 1 is a schematic representation of the entire device with the essential elements of the device. Four milk cups 1 are connected through respective suction lines 2 pneumatically to a device 3 that produces reduced pressure, so that the reduced pressure produced in the milk cup sets the teat rubber arranged inside the milk cup into a pulsating milking movement. The milk cups 1 each have a milk line 4 at their lower end, which conducts the reduced pressure and through which the milk is guided to a collecting container 5 from which the milk is led to a tank, which is not shown, through a milk collection line 6. A volume flow measuring equipment 7 is connected between the milk cups 1 and the milk lines 4, through which the milk volume streams can be measured separately for each teat. The measurement equipment 7 are connected through measuring lines 8 with a monitoring and control unit 9, which in turn is again connected to the reduced-pressure device 3, in order to vary the produced teat rubber movement in the milk cups 1 as a function of the measured milk volume flows.

Now, when the measured milk volume flow is reduced toward the end of the milking process, the monitoring and control unit 9 can react to this automatically by delaying the closing of the milk-guiding ducts in the teats, that is, in this way, early closing of the ducts before complete milking-out of the existing milk can be avoided.

FIG. 2 shows a milk cup according to the invention from FIG. 1, in a cup side view with a volume flow measuring equipment 7 and an air-cushion manipulator 11. An elastically deformable teat rubber 10 is secured in milk cup 1 in such a way that it can be moved in a pulsating manner with the reduced pressure from suction line 2. At its exit end, milk cup 1 has a volume flow measuring equipment 7 connected between it and before the milk line 4. Through a measuring line 8, the volume flow measured by the volume flow measuring equipment is led to a monitoring and control unit which is not shown in FIG. 2. In this practical example, an air cushion 11 is provided inside milk cup 1 between milk cup 1 and the teat rubber 10 as manipulator of the teat rubber movements. The air cushion 11 can be activated through pressure line 12, and, when the volume flow is beginning to be reduced, it can be activated with the control unit so that closing of the milk ducts due to increasing vacuum because of the decreasing milk flow can be prevented. Although in this example, an air cushion 11 is provided as manipulator, it is understandable that any other means can be used in order to alter the movement of the teat rubber depending on the reduction of the milk volume flow. Examples of this are a change of the suction pressure in suction line 2, change of the pulsation between the suction and pause phases, increasing or decreasing change of the suction pressure in the pulsation phases or mechanical alteration of the teat rubber pre-tensioning.

FIG. 3 shows schematically the change of vacuum in the pulse chamber. During phase a, the vacuum increases in the pulse chamber of the teat cup from a vacuum P1 to the higher vacuum P2 in the pulse chamber, reduced by $\Delta P$. This phase a can also be called the evacuation phase. The pressure difference $\Delta P$ preferably lies at 4 kPa. Phase b is defined as the time span during which the vacuum in the pulse chamber lies above the maximum vacuum P2 reduced by $\Delta P$. Phase b can be designated as the vacuum phase. Phase b is followed by phase c, during which the vacuum falls to p1. During phase c, aeration occurs. The time span during which the vacuum in the pulse chamber lies below P1 is designated as phase d. We can call this a pressure phase.

The extent and duration of the phases a, b and c, d may be of different lengths. Suction-phase A designates the time span which includes phases a and b. This is a suction phase, where the ratio of phases a and b may be different. According to the invention, suction phase A may also include only the vacuum phase b or only the evacuation phase d.

B in FIG. 3 shows the pause phase as example, which includes the two phases c and d. This is not absolutely necessary and it may include only the duration of the aeration phase c or pressure phase d.

Reference List

| | |
|---|---|
| 1 | milk cup |
| 2 | suction line |
| 3 | reduced pressure device |
| 4 | milk line |
| 5 | collecting container |
| 6 | milk collection line |
| 7 | volume flow measuring equipment |
| 8 | measuring lines |
| 9 | monitoring and control unit |
| 10 | teat rubber |
| 11 | air cushion |
| 12 | pressure line |

What is claimed is:

1. Method for milking of milk residue for almost completely milking-out of milk present in the udder, especially in the end phases of the milking process, in which a teat rubber in a milk cup is put into a milking movement by a reduced suction pressure through adjustable pulsation phases consisting of alternating suction phases and pause phases and through a pulsation intensity, in order to produce a milk volume flow, characterized by the fact that, the milk volume flow is continuously measured and when the volume flow is reduced, the movement of the teat rubber is altered in a targeted manner.

2. Method according to claim 1, characterized by the fact that when the volume flow goes below a predetermined threshold value over a time duration (t), the teat rubber movement is altered.

3. Method according to claim 1, characterized by the fact that the time duration of the pulsation phases is increased.

4. Method according to claim 1, characterized by the fact that the pulsation intensity is reduced in the beginning of phases.

5. Method according to claim 1, characterized by the fact that the vacuum inside the space in the milk cup is reduced.

6. Method according to claim 1, characterized by the fact that the teat rubber pretensioning is altered.

7. Method according to claim 1, characterized by the use of the method for milking-out or post-milking of all types of animal species.

8. Method according to claim 1, characterized by use for introducing a continuous unloading phase of the teat rubber.

9. Method according to claim 8, characterized by timewise parallel processes of a conventional main milking phase and a post-milking or milking-out phase with a teat rubber movement altered in a targeted manner.

10. Method according to claim 8, characterized by renewed brief post milking after the continued unloading phase.

11. Method according to claim 1, characterized by the fact that with decreasing milk volume flow the intensity of the change in the teat rubber movement is increased proportionately.

12. Method according to claim 1, characterized by the fact that the milk volume flow is measured separately for the individual teats and the teat rubber movements can be controlled separately, depending on the particular teat milk volume flow.

13. Device for milking of milk residues for an almost complete milking-out of the milk present in the udder, with a milk cup and a teat rubber secured in it, which can be displaced through suction connections in the cup with reduced pressure into a pulsating milking movement of different intensities, and has a milk outlet for a milk volume flow at its lower end, especially for carrying out the process according to claim 1, characterized by the fact that a measuring equipment is provided for measuring the milk volume flow and, with the aid of a control unit, the teat rubber movement can be controlled in a targeted manner as a function of change in the milk volume flow.

14. Device according to claim 13, characterized by the fact that a manipulator is provided inside the milk cup to alter the pre-tensioning of the teat rubber.

15. Device according to claim 14, characterized by the fact that the manipulator is operated mechanically, pneumatically, hydraulically or electrically.

16. Device according to claim 13, characterized by the fact that air cushions that can be loaded with compressed air are provided between the teat rubber and milk cup.

17. Device according to claim 13, characterized by the fact that the pulsation duration, the pulsation intensity and the course of pulsation can be adjusted and controlled at the control unit as a function of a change in the milk volume flow.

* * * * *

UNITED STATES PATENT AND TRADEMARK OFFICE
CERTIFICATE OF CORRECTION

PATENT NO. : 6,957,625 B2
DATED : October 25, 2005
INVENTOR(S) : Bernd Hennig

It is certified that error appears in the above-identified patent and that said Letters Patent is hereby corrected as shown below:

Title page,
Item [73], Assignee, "Oelde" should be -- Bonen --.

Column 5,
Line 34, "p1" should be -- P1 --.
Line 43, "d" should be -- a --.

Signed and Sealed this

Third Day of January, 2006

JON W. DUDAS
*Director of the United States Patent and Trademark Office*